N. FRANZEN.
METHOD OF AND MACHINE FOR MAKING WIRE GLASS.
APPLICATION FILED JAN. 7, 1907.
945,314.
Patented Jan. 4, 1910.
2 SHEETS—SHEET 2.
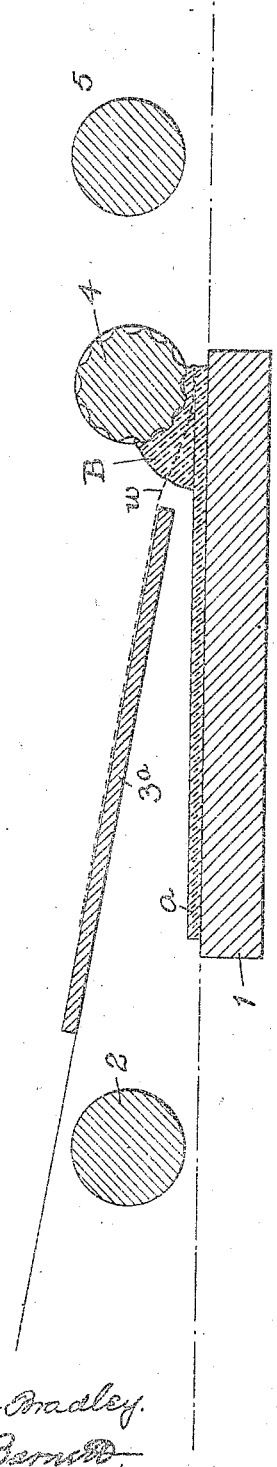
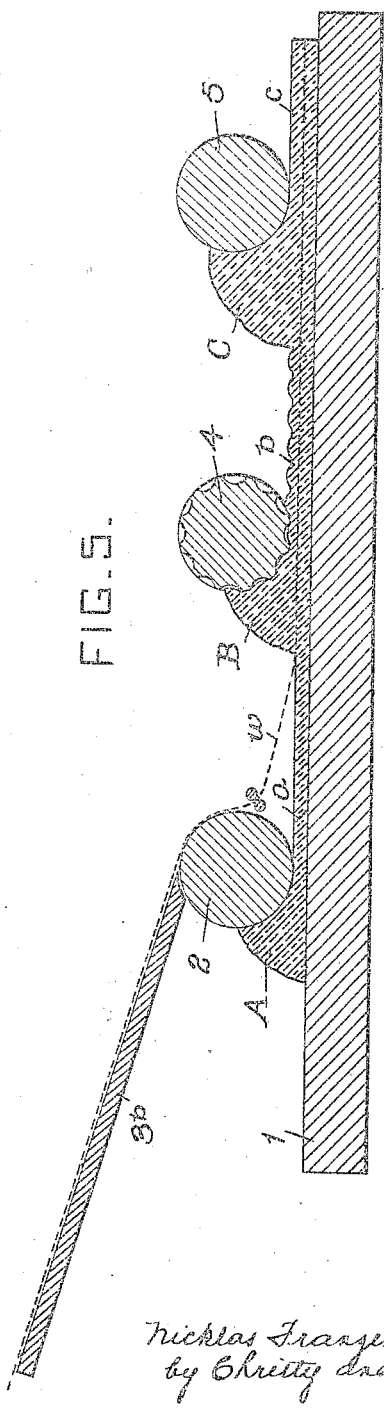

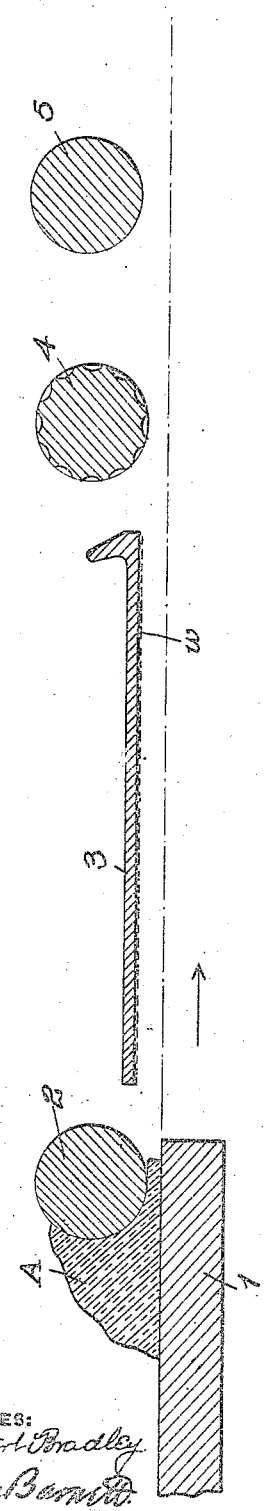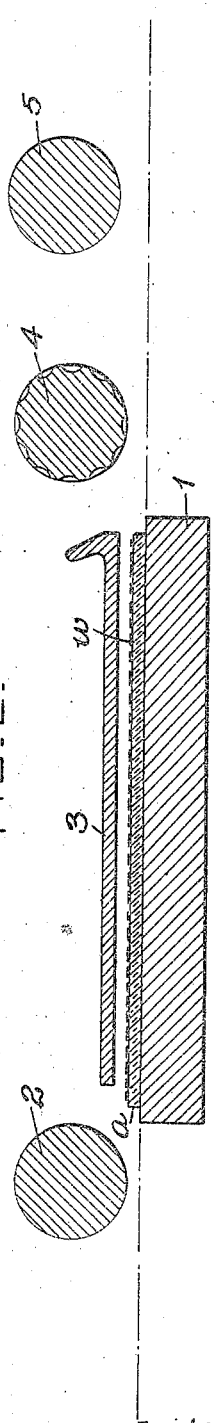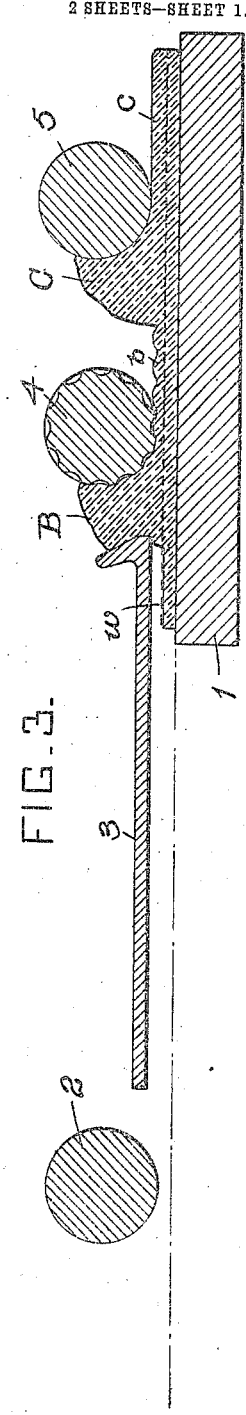

UNITED STATES PATENT OFFICE.

NICKLAS FRANZEN, OF WALTON, PENNSYLVANIA.

METHOD OF AND MACHINE FOR MAKING WIRE-GLASS.

945,314.

Specification of Letters Patent.

Patented Jan. 4, 1910.

Application filed January 7, 1907. Serial No. 351,185.

*To all whom it may concern:*

Be it known that I, NICKLAS FRANZEN, residing at Walton, in the county of Allegheny and State of Pennsylvania, a citizen of the United States, have invented or discovered certain new and useful Improvements in Methods of and Machines for Making Wire-Glass, of which improvements the following is a specification.
My invention relates to improvements in methods of and machines for making wire glass; and the objects of my improvements are a method by which wire-glass may be produced in more perfect commercial condition than has heretofore been possible, and a machine in the operation of which my improved method is accomplished.

In the making of wire-glass by the various methods now employed, relatively cold wire is buried in molten or visced glass, and the glass is thereupon brought to the shape in which it is allowed to cool and harden. The buried wire, heated by contact with the glass, expands and works within the body of the sheet, and, disturbing the substance thereof, produces a roughness or unevenness of surface which remains in the cold and hardened sheet.

My invention, broadly stated, consists in spreading upon the newly formed and still hot surface of the otherwise completed sheet of wire-glass, a finishing layer or coating of glass which will enter and fill the surface irregularities produced by the movement of the wire alluded to, and give the desired smoothness of surface to the whole.

It is possible, in following preëxisting methods, to obtain a fairly smooth surface, if the operation proceeds very slowly. But the gain in surface finish thus obtained is offset; for, when the operation is performed very slowly, the end of the sheet first finished grows cold before the completed sheet can be brought to the annealing oven; and it is then necessary before proceeding with the annealing operation, to detain the sheet at the hot end of the leer until brought to a substantially uniform temperature from end to end. The delay incident to such procedure is a serious practical disadvantage; and, aside from the risk of breakage, surface irregularity is not wholly overcome.

In the drawings which form part of this specification I have shown a machine for making wire-glass, including in its structure and mode of operation my present invention.

Though not limited thereto, I have shown my invention applied to a machine for making wire-glass by the so-called "sandwich" method; that is, the method wherein the sheet is built up of superposed layers, with the wire embedded between.

Figures 1, 2, and 3 show, diagrammatically, in longitudinal section, and in successive operative positions, such a machine, having my invention applied thereto. Figs. 4 and 5 are like views, illustrating modifications in structure.

In the several figures, like parts are designated by corresponding characters.

In Figs. 1, 2, and 3 I have shown a table, 1, a primary spreading roll, 2, a carrier for the wire, 3, a secondary spreading roll, 4, and a finishing roll, 5.

A is the initial pour of molten glass, which is spread to layer form, $a$, upon table 1 by the primary roll, 2; B is the second batch of molten glass, which is teemed upon the initial layer and spread to layer form, $b$, thereon by roll 4; and C is a third batch of molten glass, which in turn is teemed upon the previously spread and superposed layers and is spread to layer form, $c$, thereon by the finishing roll, 5.

$w$ is the web of wire or other fabric which is incorporated with the glass to form the sheet of wire-glass; and, in the instance illustrated, it is introduced beneath layer $b$ as layer $b$ is formed upon layer $a$.

The several parts of the apparatus being in the positions indicated in Fig. 1, table 1 being at the extreme left, roller 2, carrier 3, roll 4, and roll 5 standing in successive positions to the right, a batch of molten glass, A, is teemed upon the forming surface of table 1, to the left of the initial forming roll, 2. Table 1 is then propelled to the right, in the direction indicated by the arrow in Fig. 1. It will be understood that, when it is said that table 1 is propelled to the right, it is intended merely that there shall be a relative movement of table 1 with respect to the other parts of the machine. As table 1 advances to the right with respect to the other parts, the initial forming roll 2 being properly spaced and arranged above its surface, the batch of molten glass A is progressively spread beneath roll 2 into a layer, $a$, shown in its entirety in Fig. 2. The initial layer thus spread passes, by the movement of the parts of the machine, beneath the carrier 3; and this carrier supports a web of wire or other fabric, *w*, which is to be incorporated in the finished sheet. As shown in Figs. 1, 2, and 3, this carrier bears the web, *w*, upon its under surface; and this may readily be accomplished in case the web is an iron-wire netting (which is the form now practically employed) by magnetizing the carrier 3, and causing the web *w* to adhere magnetically to its under surface. When, however, the initial layer, *a*, borne upon table 1, comes to position beneath carrier 3, the carrier is demagnetized; and the web, *w*, being then released from the magnetic attraction, falls, and rests throughout its length upon the upper surface of the layer of glass *a*. It will be noted that the wire is thus applied to the initial layer without any tension or pull or stretching or strain; and this is a feature of considerable value. Further progress of the table 1 to the right relative to the other parts of the machine carries the layer *a*, bearing upon its surface the web *w*, from beneath carrier 3, and exposes the advance end thereof between carrier 3 and the secondary spreading roll, 4. Here a second batch of molten glass, B, is teemed upon the wire-covered surface of layer *a*; and, as the table advances relatively to the secondary spreading-roll, 4, that roll spreads the molten batch of glass B to layer form upon the wire-covered surface of the layer *a*. Thus a sheet of wire glass is formed. The exposed surface of this sheet, as it passes from beneath the secondary forming roll 4, becomes rough and uneven, in consequence of the thermal working of the wire within the sheet. Accordingly, as table 1 progresses, I arrange a third roll, 5, which I call a finishing roll, suitably spaced above table 1 and rearward from roll 4, which shall spread to layer form upon the otherwise completed sheet which passes from beneath roll 4, a third batch of molten glass, C; and, spreading this last batch of molten glass upon the otherwise completed sheet, it leaves the whole sheet with a surface more level, less irregular, and better suited for practical service than has otherwise been attained in practical wire-glass manufacture.

It will be understood that it is a matter of mere adjustment of rolls 2, 4, and 5, relative to the surface of table 1, to produce the desired thickness of the successive layers, and to obtain a sheet of any ultimate desired and practical thickness.

The position of roll 5 rearward from roll 4, is determined by practical conditions. The working of the wire within the sheet and the consequent surface disturbance occur immediately upon the incorporation of the wire, which in this instance is simultaneous with the formation of the sheet. The pouring and spreading of the final layer, which characterizes my present invention, will of course follow at a sufficient interval to allow the thermal working described above to take place, and yet so closely upon the formation of the otherwise completed sheet that the union may be complete, and the compound sheet built up into a coherent whole. Within such practical limits, the interval between rolls 4 and 5 may vary.

Since the surface of the sheet as it passes from beneath roll 4 is unfinished, and since more glass is to be spread upon it and consolidated upon it to form the finished sheet, I consider it desirable, though not essential to my invention, to construct roll 4 with a pitted surface, of the character shown and described in Letters Patent No. 823,112, granted me June 12, 1906. The roll so constructed bears throughout its surface pocket-like depressions or *culs de sac*, in which small quantities of air are entrapped by the molten glass, as the roll progresses to spread the molten glass to layer form; and these small bodies of air, entrapped as the sheet is being formed, insulate the surface of the sheet from chilling contact with the surface of the forming roll at these points. Thus, the surface of the sheet as it passes from beneath such a pitted roll bears protuberances or slight excrescences of soft, unhardened glass; and upon such a surface the third layer *c* may be spread by the finishing roll 5 and more intimately incorporated to form the finished sheet.

In Fig. 4 I have shown a modification in the structure of the machine; for, in place of such a carrier for the wire as I have described and shown in Figs. 1, 2, and 3, and indicated by numeral 3, I employ in this instance a chute, 3ª, upon the upper surface of which the wire, *w*, rests. In this wire-carrier I lay the web of wire, *w*, so that its end projects beyond the lower end thereof; and, as in the operation of the machine the table 1 advances with the initial layer *a* upon it beneath the carrier 3ª, this depending end of the web of wire will rest upon the anterior end of the layer *a*. The second batch of glass, B, being then teemed upon this end of the web of wire which rests upon the forward end of the layer *a*, the carrier 3ª is retracted; and, as it is withdrawn, the web of wire, *w*, comes to rest upon the upper surface of layer *a*. From that point on, the operation of the machine progresses as in the first instance.

In Fig. 5 there is another slight modification, in that the carrier for the wire, in this case indicated by 3ᵇ, is not shifted independently, nor is the wire laid down upon layer *a* from end to end before the spreading of the second layer *b* is begun; but the carrier is gradually retracted as the roll 4 advances, and the web of wire *w* is gradually fed from the carrier and brought to position upon *c* layer *a* by the molten glass, as it advances in front of roll 4. In the case of this Fig.

5, a further modification is shown, in that the sheet is built up progressively, the initial layer, a, being in course of formation while the other layers are being successively spread upon its anterior end. It will be understood that, so far as my present invention goes, these are obvious variations; the arrangement and operation of the machine being in such respects in the control of the builder and operator, and the determining conditions are matters of temperature, solidity, and expansion and oxidation of the various component parts of the sheet of wire-glass.

In the specification and claims I employ the terms "web," "fabric," and "wire" to designate the embedded substance which gives character to the finished product. Under existing conditions, this substance is a netting, woven or twisted, of light iron wire. It will be understood the invention is not limited, but is applicable to the making of such a product whatever be the material of which the embedded substance is formed and whatever be its shape, so long as there exists an irregularity of surface consequent upon conditions of formation and which the producer seeks to overcome.

I claim as my invention:

1. The herein described method of making wire-glass which consists in forming a sheet of glass with a web of wire buried beneath its surface and within its body and with protrusions of soft or unchilled glass upon its surface, and in spreading upon the protrusion-bearing surface of such sheet when newly formed a final finishing layer of glass.

2. The herein described method of making wire-glass which consists in spreading a batch of molten glass to layer form, spreading and applying to and unifying with the initial layer a second layer of glass, with a web of wire inclosed between the layers, and embedded in the sheet which the united layers form, and finally spreading upon the surface of such sheet when newly formed a final finishing layer of glass.

3. In a machine for making wire-glass the combination with means for forming a sheet of glass having a web of wire buried beneath its surface and within its body and having also protuberances of soft or unchilled glass upon its surface, of means for spreading upon the protrusion-bearing surface of such sheet a final finishing layer of glass, substantially as described.

4. In a machine for making wire-glass the combination of means for spreading a batch of molten glass to layer form, means for spreading and applying to and unifying with the initial layer a second layer of glass with a web of wire inclosed between the layers and embedded in the sheet thus formed, and means for spreading upon the surface of such sheet a final finishing layer of glass, substantially as described.

5. In a machine for making wire-glass the combination of means for spreading a batch of molten glass to layer form upon a supporting surface, means for applying to the surface of such layer when formed a web of fabric, means for spreading upon said fabric-covered layer a second batch of molten glass to layer form, and means for spreading upon the surface of the wire-containing sheet thus built up a third batch of molten glass to layer form, substantially as described.

6. In a machine for making wire-glass the combination of a supporting surface, means for spreading a batch of molten glass to layer form upon such supporting surface, a wire-carrier magnetizable to hold and carry a web of wire, movable to and from position above the supporting surface and demagnetizable to release a web of wire carried by it and to permit such web to fall and rest upon a layer of glass spread upon said supporting surface, means for embedding the wire in glass upon such supporting surface, and means for spreading upon the surface of the sheet thus formed a final finishing layer of glass, substantially as described.

7. The method of making wire-glass which is described herein, which consists in spreading a batch of molten glass to layer form upon a forming surface, depositing thereon without embedding and without stress or strain or pull a web of wire, and in applying to the initial layer after the wire has been deposited thereon, a second layer of glass, and incorporating such second layer with the initial layer through the said web of wire, substantially as described.

In testimony whereof, I have hereunto set my hand.

NICKLAS FRANZEN.

Witnesses:
CHARLES BARNETT,
W. H. WILSON.